INVENTOR
ROBERT A. SCOTT
BY
ATTORNEY

Jan. 6, 1970      R. A. SCOTT      3,487,847

LIQUID LEVEL CONTROL DEVICE

Original Filed July 19, 1966      2 Sheets-Sheet 2

INVENTOR
ROBERT A. SCOTT
BY Edwin E. Greigg
ATTORNEY

United States Patent Office 3,487,847
Patented Jan. 6, 1970

3,487,847
LIQUID LEVEL CONTROL DEVICE
Robert A. Scott, R.F.D. 5, Westminster, Md. 21157
Continuation of application Ser. No. 566,276, July 19, 1966. This application Nov. 5, 1968, Ser. No. 774,592
Int. Cl. B67d 5/54; F04f 1/00
U.S. Cl. 137—209                                3 Claims

ABSTRACT OF THE DISCLOSURE

A liquid level control device for controlling the flow of liquid from a supply receptacle to a receiver receptacle positioned below the former in which a first chamber extends into the liquid of the supply receptacle and has a liquid admitting tube therein and a port opening to a second chamber in the supply receptacle which has a vent to atmosphere. A discharge conduit is connected to the second chamber below the vent thereof and extends over one of the side walls of the supply receptacle into the receiver receptacle with the curved portion of the discharge tube over the side wall forming an air trap. An air pressure is applied to the first chmaber forcing the liquid therein into the second chamber and out through the discharge tube connected thereto or through the vent depending on the presence of an air trap in the discharge tube.

---

This application is a continuation of Ser. No. 566,276, filed July 19, 1966, now abandoned.

This invention relates to liquid level control devices and, more particularly, to such devices for controlling liquid level in a receiver receptacle which is located below the controlling device.

Liquid level control has applications in many fields, and it has become a problem especially where the receptacle or vessel in which the liquid level is under control is subjected to irregular drainage patterns. The difficulty to automatically replenish the supply of liquid in these receptacles in the past has led to the presently popular mehtod of manual control for maintaining the liquid level constant in these receptacles. Some attempts have been made, however, to completely automate liquid level control. One such method utilizes a siphonic action between the upper and lower receptacle. In principle, this method utilizes a liquid filled supply receptacle for siphonically feeding the receptacle whose liquid level is to be controlled. When the liquid level lowers a given amount, it allows a release of pressure from the connecting conduit between the two receptacles. This release of pressure, in effect, releases an air trap in the upper receptacle which had previously prevented the flow of liquid in the conduit, but now begins a flow between the two receptacles which usually starts a siphon. When, however, liquid in the lower receptacle has been restored, the siphon must be automatically stopped, that is, the air trap condition must be re-established in the upper recepacle in order o stop the siphonic action. One method of attempting this step is to have the flow rate of liquid supplying the upper receptacle slower than the flow rate leaving the upper receptacle by means of the siphonic operaed conduit. Thus, when a sufficient amount of liquid passed from the upper receptacle to the lower receptacle, the inlet portion of the conduit connected to the upper receptacle will be exposed to atmosphere, and hence will suck in air rather than liquid because of the different flow rates previously mentioned between the source and the conduit. At this point if the liquid is restored a sufficient amount in the supply or upper receptacle, such that the inlet end of the conduit begins to such liquid rather than air, then an air trap can be established at some point within the conduit to stop the siphonic action, and hence the flow of fluid from the upper receptacle to the lower receptacle. In practice, however, it is difficult to control the rate of liquid flow into the supply receptacle such that it will completely cut off the air suction in the inlet end of the conduit at that significant time when the lower receptacle has been filled. Usually, both air and liquid are sucked into the inlet end of the conduit which defeats the purpose of cyclic siphonic action and causes constant liquid flow from the upper receptacle to the lower receptacle. It is the purpose of this invention to avoid the above difficulties in automatic cyclic flow from an upper receptacle to a lower receptacle.

Accordingly, the primary object of this invention is to provide a liquid level control device having no moving parts which can be easily placed in an upper liquid receptacle for supplying fluid and controlling the level thereof in a lower liquid receptacle.

Another object of this invention is to provide a liquid level control device which utilizes an air trap action for controlling the supply of liquids from an upper receptacle to a lower receptacle and which automatically cuts off any siphonic action when the lower receptacle receives a given amount of liquid.

Another object of this invention is to provide a plurality of liquid control devices arranged in a parallel and operating from a common upper receptacle for automatically controlling the liquid level in a corresponding number of lower receptacles.

It is yet another object of this invention to provide a liquid level control device which is formed for a unitary structure which can be utilized with any size and shape liquid supply receptacle.

It is a further object of this invention to provide a liquid level control device which can control the level of liquid in a lower receptacle independently of the liquid level in an upper supply receptacle.

It is still yet another object of this invention to provide a liquid level control device which is positioned within a liquid supply receptacle and has a single flexible conduit adapted to extend over any one of the side walls of the supply receptacle to a lower secondary liquid receptacle.

Other objects will become apparent from a study of the following specification and drawings in which.

Figure 1:
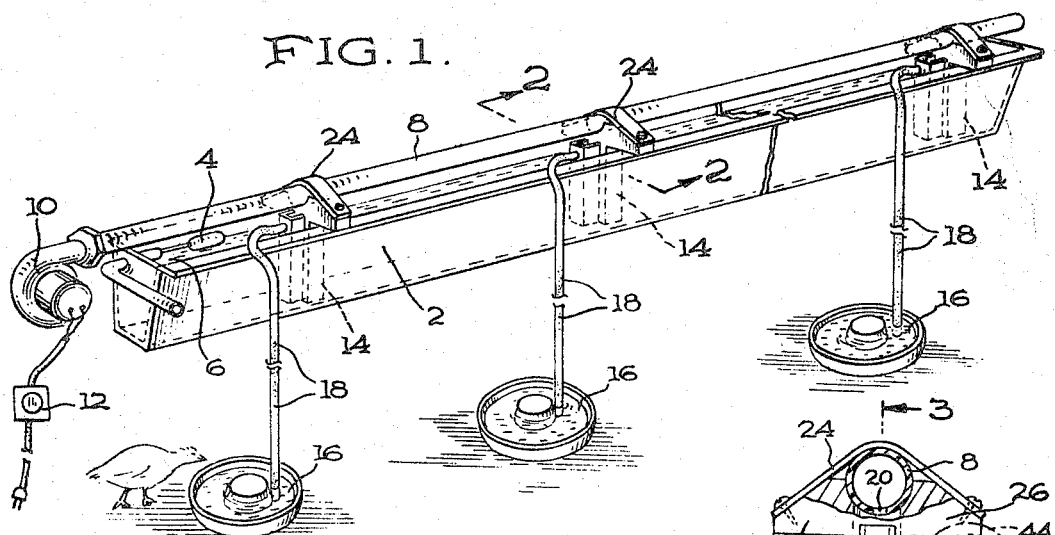
FIG. 1 is a perspective view illustrating a plural arrangement of liquid control devices according to this invention for feeding and controlling the liquid level in a plural number of secondary receptacles.

Referring now to FIG. 1, there is shown an elongated liquid supply receptacle 2 having a float-operated water supply valve 4 for maintaining a constant volume of liquid 6 therein. The tank 2 may be of any suitable elongated design having an open top. Extending along the length of the tank 2 and spaced above it a suitable small distance, is a tube member 8. The tube 8 is connected at one of its ends to an air compressor motor 10 of suitable design; a cyclic timing switch 12 is provided, as shown, for operating the motor 10 at regular intervals. The other end of the tube 8 is sealed so that the interior of the tube 8 forms an air pressure chamber. Secured along the tube 8 at equally spaced intervals are a number of liquid level control devices 14 for controlling respectively the liquid level in the lower receptacles 16 by means of their associated flexible conduits 18. Each of the outlet ends of conduits 18 is spaced a suitable distance from the bottom of the receptacles 16, and whenever the liquid level drops below the outlet end of the conduit 18, a flow action is initiated, as will be explained in detail below, to supply the receptacle 16 with liquid from the control device 14 positioned within the upper supply tank 2. The receptacles 16 may be placed in any position as long as they are below the top of the supply tank 2. Such an arrangement would find easy application in the feeding of livestock and poultry where the liquid in the receptacles 16 would remain constantly filled, by means of the liquid control devices 14, for meeting the consumption demands of animals.

Figure 2:
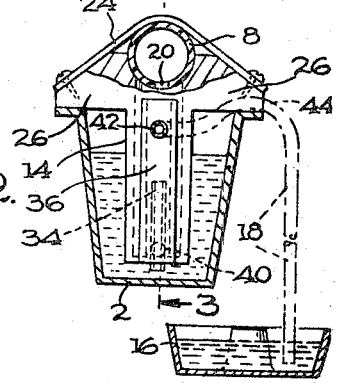
FIG. 2 is an enlarged cross-sectional view taken along section 2—2 of FIG. 1.
Figure 3:
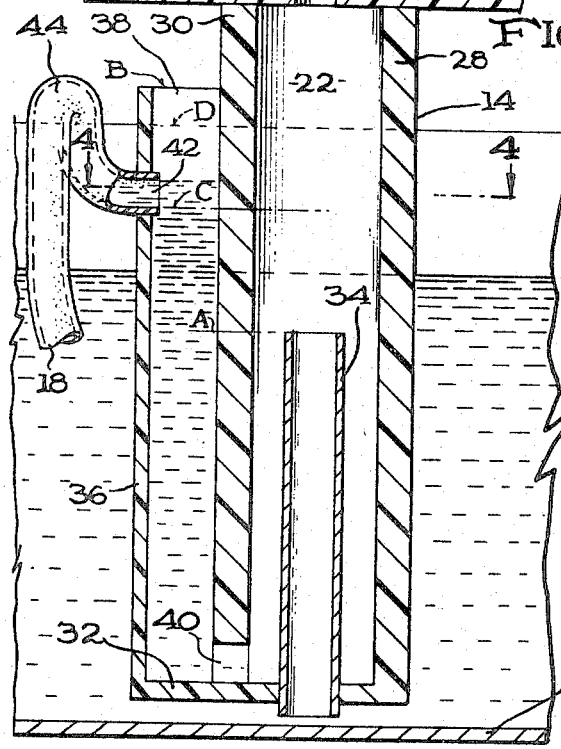
FIG. 3 is a horizontal cross-section taken along line 3—3 of FIG. 2.
Figure 4:
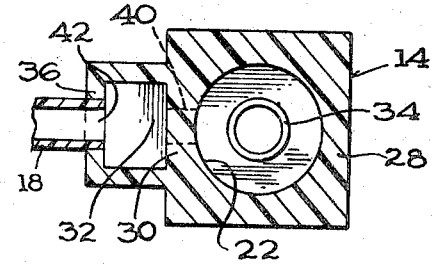
FIG. 4 is a cross-section taken along line 4—4 of FIG. 3.

Referring now to FIGS. 2 and 3, the liquid control device 14 comprises an essentially hollow unitary structure molded from a suitable plastic which is durable and light in weight. The top end of the control device 14 is contoured to fit the bottom half of tube 8, the latter of which is provided with a small hole 20 at its bottom portion for communicating with the interior chamber 22 of the control device 14. A suitable clamping means 24 secured to the brackets 26 of opposing side walls 28 and 30 provides an air-tight seal between the tube 8 and the control device 14. Extending from the bottom face 32 of the control device 14 to substantially half-way into the chamber 22 is a hollow tube 34. Immersing the control device in liquid is a convenient method but the control device would also function by connecting the bottom at tube 34 to any supply receptacle having a suitable liquid level. Juxtaposed on the side wall 30 is a channel member 36 having a smaller cross-sectional area than chamber 22, and further an open end 38 near the top of the control device and a port 40 at its lower end communicating with the chamber 22. Spaced a short distance from the top of the channel member 36 is another port 42 which forms the inlet end of conduit 18. The flexible conduit 18 is composed of a suitable plastic material, and is adapted to be hung over one of the side walls of the supply tank 2, as shown. The outlet end of the conduit 18 is then extended to the lower receptacle 16 for supplying liquid thereto.

The operation of the liquid level control device according to the principles of this invention is as follows. As the motor 10 for the blower is activated, air pressure within the interior of the tube 8 is increased. This pressure escapes through the aperture 20 into the interior chamber 22 of the control device 14. If the supply receptacle 2 contains a given amount of liquid such that the level thereof is higher than the top of tube 34, then the liquid 6 will enter the tube 34 occupying that portion of the chamber 22 and channel member 36 at the same level as the liquid on the outside of the control device. The air pressure escaping from the port 20, however, will force liquid from the chamber 22 out of the tube 34 until the liquid reaches the level A. During the liquid outflow from tube 34 the liquid will not flow through port 40 into the channel member 36 because the cross-sectional area of channel 36 is much smaller than the area of the liquid supply receptacle 2 allowing the liquid column therein to offer a counter-pressure to the liquid in chamber 22. However, as the pressure increases, the liquid level within the interior 22 will pass below level A, and since the liquid can no longer escape through tube 34, it now escapes through the port 40 and channel member 36, thereby raising the liquid level within the channel member 36 to the position B. During this phase, the liquid traps air under the curve 44 of the conduit 18. If the conduit 18 is open at its outlet end, that is, if the liquid within the receptacle 16 is below the outlet end of the conduit, fluid will drain through the conduit from the channel member 36, which is supplied through the port 40 by the liquid remaining in the chamber 22 below the level A. When the liquid from the chamber 22 has been reduced and the liquid level in chamber 36 has been lowered to the position C, flow will stop. The control device 14 will then remain in this condition as long as the motor blower 10 maintains air pressure. When the timer 12, however, shuts off the motor 10, the liquid supply will be replenished within the interior chamber 22 by inflow through the tube 34 and the control device will then be ready to begin another cycle.

It is to be understood that the liquid level in the lower receptacle 16 will be entirely dependent upon the distance between the levels B and D, that is, between the top of the channel member 36 and the highest point within the conduit 18, and not on the liquid level in the tank 2. This distance can be adjusted for any given dimension during assembly of the control device 14 within the supply tank 2. Further, if the air pressure or the original liquid level varies so that the level in the channel member 36 tends to rise above the point B, the liquid will spill back into the supply tank 2 and will not affect the operation of the control device. In fact, it has been found desirable to adjust the device 14 so that there is a slight amount of liquid spillage at the point B to make sure that the pressure on the supply conduit 18 will be constant. The control device 14 will function with the original liquid level located anywhere between points A and C, and these points may be made as wide apart as necessary to come within the tolerance range for the maintenance of the original liquid level by the float operated supply valve 4.

The tube 34 also operates as a built-in safety valve for the air pressure; this, if the air pressure gets too high, the excess pressure will bubble out through the tube 34 into the tank 2. Tube 34 must be long enough and immersed in the liquid far enough so that air pressure will not escape unless excessive. Further, if after one or more cycles of operation the lower receptacle 16 still requires fluid, the control device 14 will continue to return to the condition for initiating a new flow action, and not until the distance between the outlet end of the conduit 18 and the fluid level in the receptacle 16 equals the distance between levels B and D, will the air become trapped in the curved section 44 of the conduit to thus prevent the initiation of flow.

Figure 5:
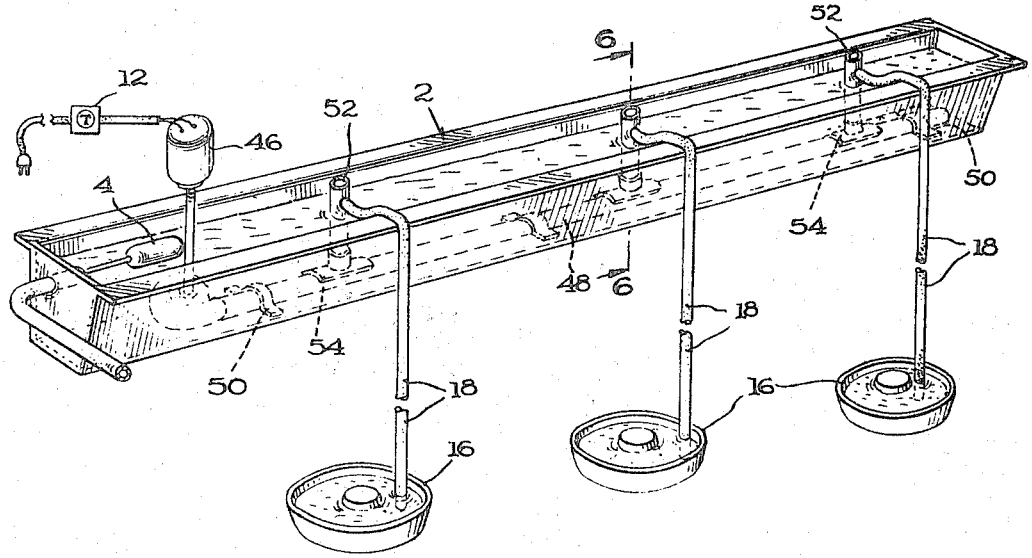
FIG. 5 is a perspective view of another embodiment employing the principle of this invention.

In FIG. 5 there is shown another embodiment of the invention employing a modification of the control device 14 in FIGS. 1–4 arranged, however, in the same manner as that shown in FIG. 1. In this modification, the liquid in the supply tank 2 is raised by means of a centrifugal pump 46 to the inlet ports 42 of the discharge conduits 18 for initiating flow therethrough if the air trap is broken in the manner described for the control device in FIGS. 1–4.

Figure 6:
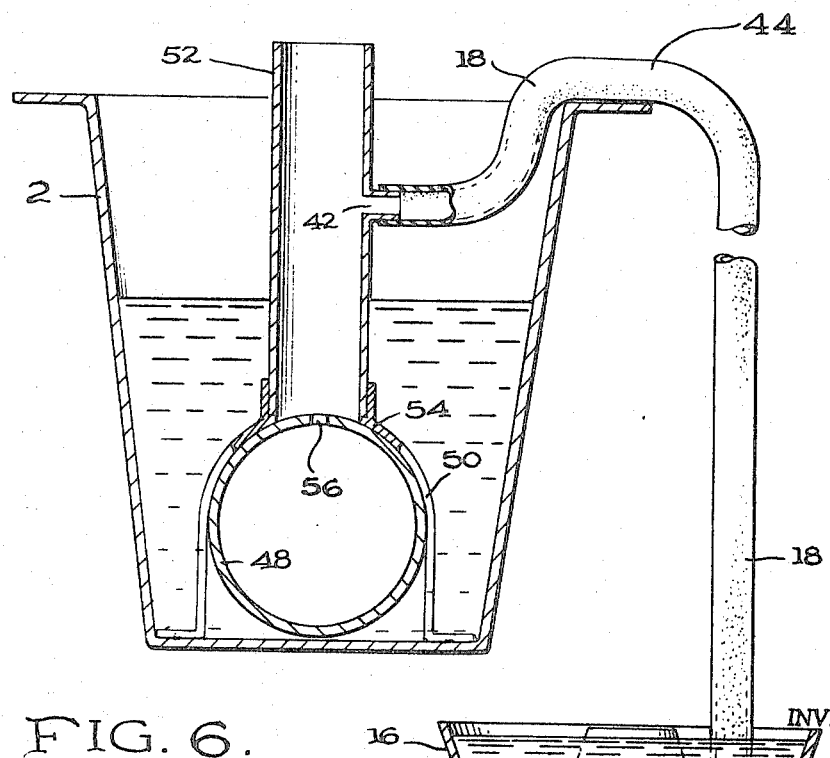
FIG. 6 is a cross-section taken along line 5—5 of FIG. 5.

FIG. 6 shows a detailed cross-section of one of the modified control devices 52. A tube 48, running substantialy the length of the tank 2 and held on the bottom wall by suitable clamps 50, has the centrifugal pump connected at one end and is sealed at its other end. Connected at spaced intervals by suitable saddle fittings 54 are vertically extending hollow chambers 52 having their upper ends open to atmosphere. The lower end of the chamber 52 overlies a small hole 56 in the top of the tube 48 and near the upper end of the chamber is the inlet port 42 of the discharge tube 18.

As previously mentioned, the operation of the device shown in FIGS. 5 and 6 differs from the operation of the device shown in FIGS. 1–4 in the manner in which the liquid in the supply tank 2 is raised to the inlet port 42 of the discharge tube 18. When the centrifugal pump 46 is shut off, the liquid in the supply tank 2 will occupy the interior of tube 58 and a portion of the chamber 52 by means of the aperture 56 connecting the tube 48 and the chamber. Under these conditions the liquid level in the chamber 52 will be the same as the liquid level in the supply tank 2. When the timer 12 turns on the centrifugal pump 46, the liquid in the chamber 52 is then caused to rise drawing from the liquid suply in the tank 2. As previously stated, if the air trap in the curved portion 44 of the discharge tube 18 is broken, as when the liquid level in the receiver receptacle 16 falls below the outlet end of the tube 18, then the liquid in the chamber 52 will be caused to flow into the inlet port 42 and through the discharge tube 18. This flow will continue until the timer 12 shuts off the pump 46. If, on the other hand, the air trap in the curved portion 44 is not broken, the liquid in the chamber 52 will rise to the top and overflow into the liquid supply tank 2 until again the timer shuts off the pump 46.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

That which is claimed is:

1. In a liquid level control device; a supply receptacle having liquid therein, a receiver receptacle disposed below said liquid supply receptacle, an elongated hollow housing extending into and submerged below the liquid level in said supply receptacle and having a venting means extending above the level of liquid in said supply receptacle, a discharge conduit having an inlet end connected to said venting means and an outlet end immersed in the liquid of said receiver receptacle, an air trap positioned in said conduit and means for pumping the liquid in said hollow housing past said inlet end of said discharge conduit and out said venting means.

2. In a liquid level control devices; a supply receptacle having liquid therein, a receiver receptacle disposed below said supply receptacle, a hollow housing extending into said supply receptacle, means for admitting said liquid to the interior of said housing, said housing having an outlet chamber connected to the interior of said housing below said liquid admitting means, said outlet chamber having a venting means above said liquid admitting means, a discharge conduit connecting said outlet chamber below said venting means thereof to said receiver receptacle, said conduit having an air trap means therein, and means for supplying air pressure to said housing whereby liquid is forced below the level of said admitting means to said venting means of said outlet chamber.

3. In a liquid level control device; a liquid supply receptacle having liquid therein, a receiver receptacle disposed below said liquid supply receptacle, a hollow housing extending into said liquid in said supply receptacle, an inlet conduit connected to the interior of said housing below the level of said liquid and extending into said liquid, an auxiliary chamber communicating with the interior of said housing and having a venting means positioned above said liquid in said supply receptacle, a flexible discharge conduit connected to said auxiliary chamber below said venting means thereof, said conduit having an air-trap curved portion overlying one of the side walls of said supply receptacle, the outlet end of said conduit extending into said receiver receptacle, and means for supplying gas pressure to said housing whereby the liquid above said inlet conduit in said housing is returned to said supply receptacle and the liquid below said inlet conduit is delivered to said venting means of said auxiliary chamber.

References Cited

UNITED STATES PATENTS

| | | | |
|---|---|---|---|
| 2,347,076 | 4/1945 | Burckhardt | 137—453 |
| 2,376,623 | 5/1945 | Romberg | 137—130 |
| 2,846,740 | 8/1958 | Edstrand | 222—373 |
| 2,376,623 | 5/1945 | Romberg | 137—130 |
| 2,846,740 | 8/1958 | Edstrand | 222—373 |

ALAN COHAN, Primary Examiner

U.S. Cl. X.R.

137—373, 453, 571, 624.11

PO-1050
(5/69)

UNITED STATES PATENT OFFICE
CERTIFICATE OF CORRECTION

Patent No. __3,487,847__  Dated __January 6, 1970__

Inventor(s) __Robert A. Scott__  PAGE - 1

It is certified that error appears in the above-identified patent and that said Letters Patent are hereby corrected as shown below:

In the heading, "3 Claims" should read --5 Claims--; col. 1, line 22, "chmaber" should read --chamber--; line 40, "mehtod" should read --method--; line 56, "recepacle" should read --receptacle--; line 60, "operaed" should read --operated--; line 70, "such" should read --suck--; col. 2, line 25, "a" before "parallel" should be deleted; line 30, "for" should read --of--; col. 4, line 32, "this" should read --thus--; line 56, "tialy" should read --tially--so that the word will read --substantially--; the following two (2) claims should be inserted after claim 3 in col. 6:

4. In a liquid level control device; a supply receptacle having liquid therein, a receiver receptacle disposed below said supply receptacle, a hollow housing, means for admitting said liquid to the interior of said housing, said housing having an outlet chamber connected to the interior of said housing below said liquid admitting means, said outlet chamber having a venting means above said liquid admitting means, a discharge conduit connecting said outlet chamber below said venting means thereof to said receiver receptacle, said conduit having an air trap means therein, and means for supplying air pressure to said housing whereby liquid is forced below the level of said admitting means to said venting means of said outlet chamber.

5. In a liquid level control device; a liquid supply receptacle having liquid therein, a receiver receptacle disposed below said liquid supply receptacle, a hollow housing, an inlet conduit extending into said liquid (continued on page 2)

PO-1050
(5/69)

UNITED STATES PATENT OFFICE
CERTIFICATE OF CORRECTION

Patent No. 3,487,847　　　　　　Dated January 6, 1970

Inventor(s) Robert A. Scott　　　　　　PAGE - 2

It is certified that error appears in the above-identified patent and that said Letters Patent are hereby corrected as shown below:

and having one end connected to the interior of said housing below the level of said liquid, an auxiliary chamber communicating with the interior of said housing and having a venting means positioned above said liquid, a flexible discharge conduit connected to said auxiliary chamber below said venting means, said conduit having an air trap curved portion, the outlet end of said conduit extending into said receiver receptacle, and means for supplying gas pressure to said housing, whereby the liquid above said inlet conduit in said housing is returned to said supply receptacle and the liquid below said inlet conduit is delivered to said venting means of said auxiliary chamber.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents